United States Patent
Yoo et al.

(10) Patent No.: US 8,557,422 B2
(45) Date of Patent: Oct. 15, 2013

(54) HIGH CAPACITY BATTERY CELL EMPLOYED WITH TWO OR MORE UNIT CELLS

(75) Inventors: Kwangho Yoo, Daejeon (KR); Ji Heon Ryu, Seoul (KR); Hyunwoo Park, Daejeon (KR)

(73) Assignee: LG Chem, Ltd. (KR)

( * ) Notice: Subject to any disclaimer, the term of this patent is extended or adjusted under 35 U.S.C. 154(b) by 339 days.

(21) Appl. No.: 12/308,160

(22) PCT Filed: May 31, 2007

(86) PCT No.: PCT/KR2007/002653
§ 371 (c)(1),
(2), (4) Date: May 22, 2009

(87) PCT Pub. No.: WO2007/142428
PCT Pub. Date: Dec. 13, 2007

(65) Prior Publication Data
US 2010/0015511 A1    Jan. 21, 2010

(30) Foreign Application Priority Data
Jun. 5, 2006  (KR) .......................... 10-2006-0050143

(51) Int. Cl.
*H01M 6/10* (2006.01)
*H01M 10/04* (2006.01)
*H01M 2/18* (2006.01)

(52) U.S. Cl.
USPC .............. 429/94; 429/152; 429/162; 429/130

(58) Field of Classification Search
None
See application file for complete search history.

(56) References Cited

U.S. PATENT DOCUMENTS

| | | | | |
|---|---|---|---|---|
| 6,905,790 | B2 * | 6/2005 | Benson et al. | 429/7 |
| 2003/0049527 | A1 * | 3/2003 | Yageta et al. | 429/179 |
| 2006/0275661 | A1 * | 12/2006 | Kim et al. | 429/217 |
| 2007/0218355 | A1 * | 9/2007 | Ryu et al. | 429/152 |

FOREIGN PATENT DOCUMENTS

| | | |
|---|---|---|
| CN | 1800239 A | 8/2002 |
| JP | 2004-139924 A | 5/2004 |
| JP | 2004-303535 A | 10/2004 |
| KR | 19990028469 A | 2/2001 |

(Continued)

*Primary Examiner* — Barbara Gilliam
*Assistant Examiner* — Angela Martin
(74) *Attorney, Agent, or Firm* — Lerner, David, Littenberg, Krumholz & Mentlik, LLP

(57) ABSTRACT

Disclosed herein is a secondary battery including two or more stacking-folding type cells ('unit cells') manufactured by winding small-sized electrode assemblies ('bicells') constructed in a stacking type structure in which electrodes having the same polarity are located at opposite sides of each electrode assembly and small-sized electrode assemblies ('full cells') constructed in a stacking type structure in which electrodes having different polarities are located at opposite sides of each electrode assembly using a long separator sheet, wherein the unit cells are mounted in a battery case, each unit cell has one or more electrode terminals protruding from each end of each unit cell, and the unit cells are mounted in a receiving part of the battery case such that the unit cells are arranged in a stacking arrangement structure or a plane arrangement structure while the electrode terminals of the unit cells are connected with each other. According to the present invention, the electrical and physical coupling force between the unit cells is increased. Consequently, the high-capacity secondary battery according to the present invention exhibits an improved structural stability. In addition, it is possible to greatly increase the capacity of the secondary battery according to the present invention through a simple assembly process.

19 Claims, 3 Drawing Sheets

(56) References Cited

FOREIGN PATENT DOCUMENTS

| KR | 2001-0082058 A | 8/2001 |
| KR | 2001-0082059 A | 8/2001 |
| KR | 2001-0082060 A | 8/2001 |
| KR | 20030053547 A | 7/2003 |
| KR | 10-2004-0092533 A | 4/2004 |
| KR | 10-2004-0054201 A | 6/2004 |
| KR | 20010082060 * | 6/2005 |
| KR | 20060009411 A | 1/2006 |
| KR | 20060072029 A | 6/2006 |
| KR | 20010038133 * | 11/2006 |
| KR | 1020060072029 * | 6/2008 |

* cited by examiner

HIGH CAPACITY BATTERY CELL EMPLOYED WITH TWO OR MORE UNIT CELLS

CROSS REFERENCE TO RELATED APPLICATIONS

The present application is a national phase entry under 35 U.S.C. §371 of International Application No. PCT/KR2007/002653, filed May 31, 2007, published in English, which claims the benefit of Korean Patent Application No. 10-2006-0050143, filed Jun. 05, 2006. The disclosures of all of said applications are incorporated by reference herein.

FIELD OF THE INVENTION

The present invention relates to a high-capacity battery cell including two or more unit cells, and, more particularly, to a secondary battery including two or more stacking-folding type cells ('unit cells') manufactured by winding small-sized electrode assemblies ('bicells') constructed in a stacking type structure in which electrodes having the same polarity are located at opposite sides of each electrode assembly and small-sized electrode assemblies ('full cells') constructed in a stacking type structure in which electrodes having different polarities are located at opposite sides of each electrode assembly using a long separator sheet, wherein the unit cells are mounted in a battery case, each unit cell has one or more electrode terminals protruding from each end of each unit cell, and the unit cells are mounted in a receiving part of the battery case such that the unit cells are arranged in a stacking arrangement structure or a plane arrangement structure while the electrode terminals of the unit cells are connected with each other.

BACKGROUND OF THE INVENTION

As mobile devices have been increasingly developed, and the demand of such mobile devices has increased, the demand of secondary batteries has also sharply increased. Among them is a lithium secondary battery having high energy density and operating voltage and excellent preservation and service-life characteristics, which has been widely used as an energy source for various electronic products as well as for the mobile devices.

Based on their external and internal structures, secondary batteries are generally classified into a cylindrical battery, a prismatic battery, and a pouch-shaped battery. Especially, the prismatic battery and the pouch-shaped battery, which can be stacked with high integration and have a small width to length ratio, have attracted considerable attention.

An electrode assembly cell having a cathode/separator/anode structure, which constitutes a secondary battery, may be generally classified as a jelly-roll (winding) type electrode assembly or a stacking type electrode assembly based on the structure of the electrode assembly. The jelly-roll type electrode assembly is manufactured by coating a metal foil to be used as a current collector with an electrode active material, drying and pressing the coated metal foil, cutting the dried and pressed metal foil into the form of a band having a predetermined width and length, isolating an anode and a cathode from each other using a separator, and helically winding the anode/separator/cathode structure. The jelly-roll type electrode assembly is suitable for cylindrical batteries; however, the jelly-roll type electrode assembly is not suitable for prismatic batteries or pouch-shaped batteries because the electrode active material may be detached, and the spatial utilizability is low. On the other hand, the stacking type electrode assembly is an electrode assembly constructed in a structure in which a plurality of cathode and anode unit cells are sequentially stacked one on another. The stacking type electrode assembly has an advantage in that the stacking type electrode assembly can be constructed in a prismatic structure; however, the stacking type electrode assembly has disadvantages in that a process for manufacturing the stacking type electrode assembly is complicated and troublesome, and, when external impacts are applied to the stacking type electrode assembly, electrodes of the stacking type electrode assembly are pushed with the result that short circuits occur in the stacking type electrode assembly.

In order to solve the above-described problems, there has been developed an electrode assembly having a novel structure, which is a combination of the jelly-roll type electrode assembly and the stacking type electrode assembly, i.e., a stacking-folding type electrode assembly constructed in a structure in which full cells having a cathode/separator/anode structure of a predetermined unit size or bicells having a cathode (anode)/separator/anode (cathode)/separator/cathode (anode) structure of a predetermined unit size are folded using a long continuous separation film. Examples of such a stacking-folding type electrode assembly are disclosed in Korean Patent Application Publication No. 2001-82058, No. 2001-82059, and No. 2001-82060, which have been filed in the name of the applicant of the present patent application.

Generally, the number of the full cells or bicells constituting the stacking-folding type electrode assembly is increased in order to increase the capacity of the stacking-folding type electrode assembly. As the number of the full cells or bicells is increased, however, a great deal of working time is required to fold the increased full cells or bicells. In addition, when some of the cells malfunction, the electrode assembly also malfunctions.

Meanwhile, Korean Patent Application Publication No. 2004-0054201 and No. 2004-0092533 disclose technologies for connecting two or more stacking or winding electrode assemblies in parallel with each other and mounting the connected electrode assemblies into a pouch-shaped battery case or a prismatic battery case, to increase the capacity of a secondary battery, although the electrode assemblies are not constructed in the above-described stacking-folding type structure. However, these technologies have problems in that the two or more electrode assemblies are coupled to each other only at electrode terminals thereof in order to accomplish the electrical connection between the electrode assemblies, and the electrode terminals protrude from only one-side ends of the electrode assemblies, whereby the structural stability of the secondary battery is very low. This problem may act as one of the major factors to deteriorate the stability of the secondary battery when the secondary battery is exposed to external environments, such as impacts and vibrations, which are frequently generated in the secondary battery requiring high capacity.

Consequently, there is a high necessity for a technology to increase the capacity of a secondary battery and increase the electrical and physical coupling force between cells constituting the secondary battery, thereby improving the structural stability of the secondary battery.

SUMMARY OF THE INVENTION

Therefore, the present invention has been made to solve the above-mentioned problems, and other technical problems that have yet to be resolved.

It is an object of the present invention to provide a secondary battery in which the electrical and physical coupling force between cells constituting the secondary battery is increased, whereby the structural stability of the secondary battery is improved.

It is another object of the present invention to provide a secondary battery in which the capacity of the secondary battery is greatly increased through a simple assembly process.

It is a further object of the present invention to provide a middle- or large-sized battery module including a plurality of secondary batteries according to the present invention.

In accordance with one aspect of the present invention, the above and other objects can be accomplished by the provision of a secondary battery including two or more stacking-folding type cells ('unit cells') manufactured by winding small-sized electrode assemblies ('bicells') constructed in a stacking type structure in which electrodes having the same polarity are located at opposite sides of each electrode assembly and small-sized electrode assemblies ('full cells') constructed in a stacking type structure in which electrodes having different polarities are located at opposite sides of each electrode assembly using a long separator sheet, wherein the unit cells are mounted in a battery case, each unit cell has one or more electrode terminals protruding from each of opposite ends of each unit cell, and the unit cells are mounted in a receiving part of the battery case such that the unit cells are arranged in a stacking arrangement structure or a plane arrangement structure while the electrode terminals of the unit cells are connected with each other.

Consequently, the secondary battery according to the present invention has advantages in that two or more unit cells are included in one battery case, whereby the capacity of the secondary battery is increased, the unit cells constituting the secondary battery are electrically and mechanically connected to each other via electrode terminals protruding from opposite ends of the unit cells, whereby the structural stability of the secondary battery against external environments, such as impacts and vibrations, is improved. Also, the two or more unit cells are stably coupled to each other as a single unit body, and therefore, the treatment of the unit cells is very easy and convenient during the assembly of the secondary battery.

In the above-described conventional secondary battery constructed in a structure in which two or more unit cells are connected to each other at only the electrode terminal regions (upper ends) located at one-side ends of the unit cells, and the electrode terminals protrude outward from the battery case, on the other hand, the unit cells are separated from each other at the other-side ends (lower ends) of the unit cells. As a result, the electrode terminal regions at the upper ends of the unit cells may easily break when external impacts or vibrations are applied to the conventional secondary battery. In addition, the treatment of the unit cells is very difficult, during the assembly of the secondary battery, due to the separated lower end structure of the unit cells. The secondary battery according to the present invention solves simultaneously the above-described problems by virtue of the unique structure of the secondary battery.

According to the present invention, each unit cell includes a predetermined number of full cells or bicells, as described above.

The full cell is a unit cell constructed in a cathode/separator/anode structure. Specifically, the full cell is a cell having a cathode and an anode positioned at the opposite sides thereof, respectively. For example, the full cell may be either a cell having a cathode/separator/anode structure, which is a basic structure, or a cell having a cathode/separator/anode/separator/cathode/separator/anode structure. In order to construct a unit cell using the full cell, it is necessary to stack a plurality of full cells one on another, such that the cathodes and the anodes face each other, while a separation film is disposed between the full cells.

On the other hand, the bicell is a cell having identical electrodes positioned at the opposite sides thereof, i.e., a cell having a cathode-cathode structure or a cell having an anode-anode structure. For example, the bicell may be a cell constructed in a cathode/separator/anode/separator/cathode structure or a cell constructed in an anode/separator/cathode/separator/anode structure. In order to construct a unit cell using the bicell, it is necessary to stack a plurality of bicells one on another, such that bicells (cathode bicells) having a cathode/separator/anode/separator/cathode structure and bicells (anode bicells) having an anode/separator/cathode/separator/anode structure face each other, while a separation film is disposed between the bicells.

According to the present invention, the bicells are preferably used to construct each unit cell. Preferably, the number of bicells is 3 to 30 in consideration of the assembly process and operational performance of the battery.

The unit cells whose electrode terminals are connected with each other are constructed in the stacking arrangement structure or the plane arrangement structure, as described above. The "stacking arrangement structure" means a structure in which the unit cells are arranged in the thickness direction of the unit cells such that the unit cells are adjacent to each other. The "plane arrangement structure" means a structure in which the unit cells are arranged in the lateral direction of the unit cells such that the unit cells are adjacent to each other. In the plane arrangement structure, connecting members are additionally used to connect the electrode terminals at the same side ends of the unit cells.

In the secondary battery according to the present invention, the unit cells may be connected in parallel or in series with each other.

As a preferred example of the stacking arrangement type parallel connection structure, it is possible that each unit cell has one electrode terminal formed at each end thereof, the unit cells are stacked in the thickness direction of the unit cells such that the electrode terminals having the same polarity are directed in the same direction, and the electrode terminals, having the same polarity, of the unit cells are connected in parallel with each other at opposite ends thereof, whereby the unit cells are connected in parallel with each other.

Specifically, when two unit cells (a first unit cell and a second unit cell) are connected with each other to construct an electrode assembly, a cathode terminal is formed at one-side end of each unit cell, and an anode terminal is formed at the other-side end of each unit cell. For example, the first unit cell is arranged such that the cathode terminal of the first unit cell is directed to the lower end of the unit cell (based on the direction of the completed battery cell), and the second unit cell is arranged such that the cathode terminal of the second unit cell is directed to the lower end of the unit cell while the second unit cell is disposed below the first unit cell. That is, the first unit cell is stacked on the second unit cell. The cathode terminal of the first unit cell and the cathode terminal of the second unit cell, which are formed at one-side ends of the unit cells, are coupled to each other, and the anode terminal of the first unit cell and the anode terminal of the second unit cell, which are formed at the other-side ends of the unit cells, are coupled to each other. Consequently, the two unit cells are stacked one on another while the unit cells are connected in parallel with each other.

According to circumstances, it is possible that each unit cell has two electrode terminals formed at each end thereof, the electrode terminals formed at each end of each unit cell having the same polarity or different polarities. Specifically, a pair of cathode and anode terminals may be formed at each side end of each unit cell, with the result that a total of four electrode terminals protrude in pairs. In this structure, the unit cells are stacked in the thickness direction of the unit cells such that the electrode terminals having the same polarity are adjacent to each other, and the electrode terminals, having the same polarity, of the unit cells are coupled to each other at opposite ends thereof, whereby the unit cells are connected in parallel with each other.

As a preferred example of the plane arrangement type parallel connection structure, it is possible that each unit cell has one electrode terminal formed at each end thereof, the unit cells are arranged in the lateral direction of the unit cells, while the unit cells are adjacent to each other, such that the electrode terminals having the same polarity are directed in the same direction, and the electrode terminals, having the same polarity, of the unit cells are coupled to each other at opposite ends thereof by connecting members, whereby the unit cells are connected in parallel with each other.

In the plane arrangement type parallel connection structure, the connecting members are necessary to connect the electrode terminals of the unit cells, which are spaced apart from each other in the lateral direction of the unit cells, in parallel with each other. Preferably, the connecting members are electrode leads, made of a conductive material, used to electrically connect a plurality of electrode taps. In the conventional battery including the stacking or stacking/folding type electrode assembly, the electrode leads are generally used to electrically connect the electrode taps. In the battery having the plane arrangement type parallel connection structure according to the present invention, the parallel connection between the unit cells is accomplished by using the electrode leads. Therefore, the secondary battery according to the present invention does not additionally include the connecting members as compared to the conventional battery.

Specifically, when two unit cells (a third unit cell and a fourth unit cell) are connected with each other to construct an electrode assembly, a cathode terminal is formed at one-side end of each unit cell, and an anode terminal is formed at the other-side end of each unit cell. For example, the third unit cell is arranged such that the cathode terminal of the third unit cell is directed to the lower end of the unit cell, and the fourth unit cell is arranged such that the cathode terminal of the fourth unit cell is directed to the lower end of the unit cell while the fourth unit cell is in contact with one side of the third unit cell. In this plane arrangement structure, the cathode terminal of the third unit cell and the cathode terminal of the fourth unit cell are coupled to each other via the electrode lead, and the anode terminal of the third unit cell and the anode terminal of the fourth unit cell are coupled to each other via the electrode lead. Consequently, the two unit cells are arranged on the same plane while the unit cells are connected in parallel with each other.

In the above description, the unit cells are connected in parallel with each other. According to the circumstances, however, the unit cells may be connected in series with each other. In a battery cell constructed by connecting the unit cells in series with each other, the charge and discharge of the battery cell are performed with a relatively high voltage. Consequently, it is required that components of the battery cell, such as electrode active materials and an electrolyte, be safe at the high voltage condition.

As an example of the series connection structure, it is possible that each unit cell has one electrode terminal formed at each end thereof, the unit cells are arranged in the longitudinal direction of the unit cells such that the electrode terminals having the same polarity are directed in the same directions, the electrode terminals, having different polarities, of the adjacent two unit cells are connected in series with each other at facing ends thereof, and the electrode terminal connection region is bent such that the unit cells are stacked one on another.

Specifically, when two unit cells (a fifth unit cell and a sixth unit cell) are connected with each other to construct an electrode assembly, a cathode terminal is formed at one-side end of each unit cell, and an anode terminal is formed at the other-side end of each unit cell. For example, the fifth unit cell is arranged such that the cathode terminal of the fifth unit cell is directed to the upper end of the unit cell, and the sixth unit cell is arranged such that the cathode terminal of the sixth unit cell is directed to the upper end of the unit cell while the cathode terminal of the sixth unit cell is adjacent to the anode terminal located at the lower end of the fifth unit cell. Consequently, the lower end of the fifth unit cell faces the upper end of the sixth unit cell, and the anode terminal of the fifth unit cell is coupled to the cathode terminal of the sixth unit cell, whereby the two unit cells are connected in series with each other. Also, the electrode terminal connection region may be bent such that the unit cells are stacked one on another.

In this structure, the remaining electrode terminals, which are not coupled to each other, of the unit cells may be biased to the left side and the right side of the unit cells, such that the electrode terminals are spaced a predetermined distance from each other at one side of the battery case, when the unit cells are mounted into the battery case.

According to circumstances, one of the unit cells may include a long separator sheet, and the unit cells are coupled to each other by thermal welding while the remaining end of the separator sheet surrounds all the unit cells. This structure further increases the coupling force between the unit cells, thereby improving the structural stability of the secondary battery.

Preferably, the secondary battery according to the present invention is applied to a pouch-shaped secondary battery having an electrode assembly mounted in a pouch-shaped case made of a laminate sheet including a metal layer and a resin layer, for example, an aluminum laminate sheet.

The secondary battery according to the present invention is preferably used to manufacture a middle- or large-sized battery module or battery pack having a high capacity. However, the range of the high capacity is not particularly restricted.

Consequently, the present invention provides a middle- or large-sized battery module including a plurality of secondary batteries as unit cells, and a middle- or large-sized battery pack including one or more middle- or large-sized battery modules and a control unit for controlling the operation of the battery modules.

The structure of the middle- or large-sized battery module and battery pack and a method of manufacturing the middle- or large-sized battery module and battery pack are well known in the art to which the present invention pertains, and therefore, a detailed description thereof will not be given.

The middle- or large-sized battery pack according to the present invention is preferably used as a power source for various kinds of devices, such as electric vehicles, hybrid electric vehicles, electric motorcycles, and electric bicycles, which require high-output and large-capacity electricity and to which various external forces, such as vibrations and impacts, are applied.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF PREFERRED EMBODIMENTS

Now, preferred embodiments of the present invention will be described in detail with reference to the accompanying drawings. It should be noted, however, that the scope of the present invention is not limited by the illustrated embodiments.

Figure 1:
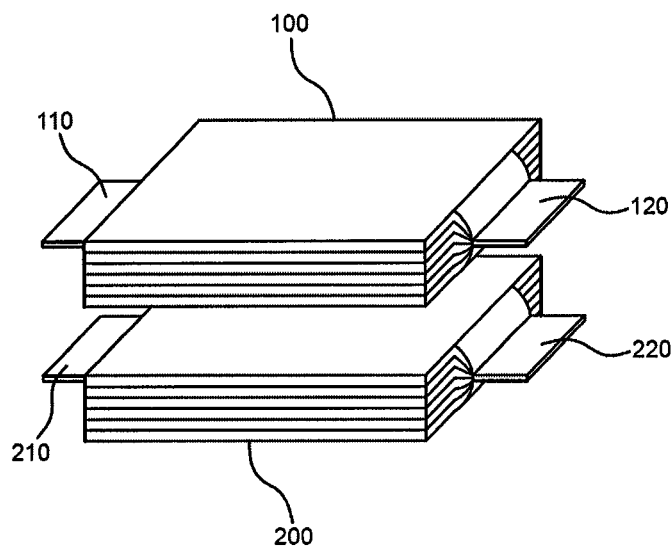
FIG. 1 is a perspective view illustrating a stacking arrangement type parallel connection structure of unit cells constituting a secondary battery according to a preferred embodiment of the present invention.

FIG. 1 is a perspective view typically illustrating a stacking arrangement type parallel connection structure of unit cells constituting a secondary battery according to a preferred embodiment of the present invention.

Referring to FIG. 1, unit cells (a first unit cell and a second unit cell) 100 and 200 are constructed in a structure in which a plurality of bicells having a stacking structure having identical electrodes at opposite sides thereof are folded while a separator sheet is disposed between the bicells. The structure of the bicells is illustrated in more detail in FIG. 4.

Figure 4:
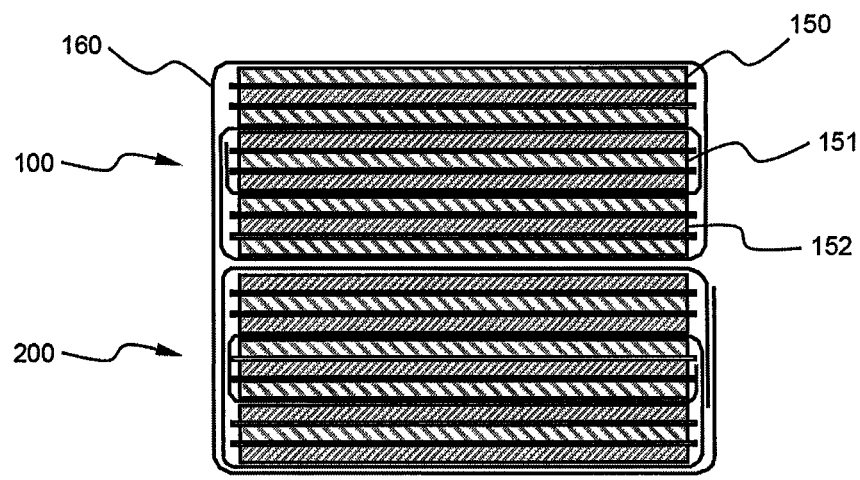
FIG. 4 is a sectional view, in part, of the unit cells constituting the secondary battery of FIG. 1.

Referring to FIG. 4, the first unit cell 100 is constructed in a structure in which bicells 150 and 152 having a cathode/separator/anode/separator/cathode structure and a bicell 151 having an anode/separator/cathode/separator/anode structure are alternately folded while a long separator sheet 160 is disposed between the bicells 150, 151, and 152. The separator sheet 160 has a length sufficient to fold the bicells 150, 151, and 152 constituting the first unit cell 100. The remaining end of the separator sheet 160 surrounds the second unit cell 200.

Referring back to FIG. 1, the first unit cell 100 and the second unit cell 200 each include a plurality of bicells. The first unit cell 100 has an anode terminal 110 and a cathode terminal 120 protruding from opposite ends thereof. Similarly, the second unit cell 200 has an anode terminal 210 and a cathode terminal 220 protruding from opposite ends thereof. The anode terminals 120 and 220 are arranged such that the anode terminals 120 and 220 are directed to the upper ends of the respective unit cells. Consequently, the first unit cell 100 is stacked on the second unit cell 200. At the opposite ends of the unit cells 100 and 200, the anode terminals 110 and 210 are coupled to each other, and the cathode terminals 120 and 220 are coupled to each other, by welding. As a result, the two unit cells 100 and 200 are arranged in a stacking arrangement structure in which the unit cells 100 and 200 are connected in parallel with each other.

Figure 2:
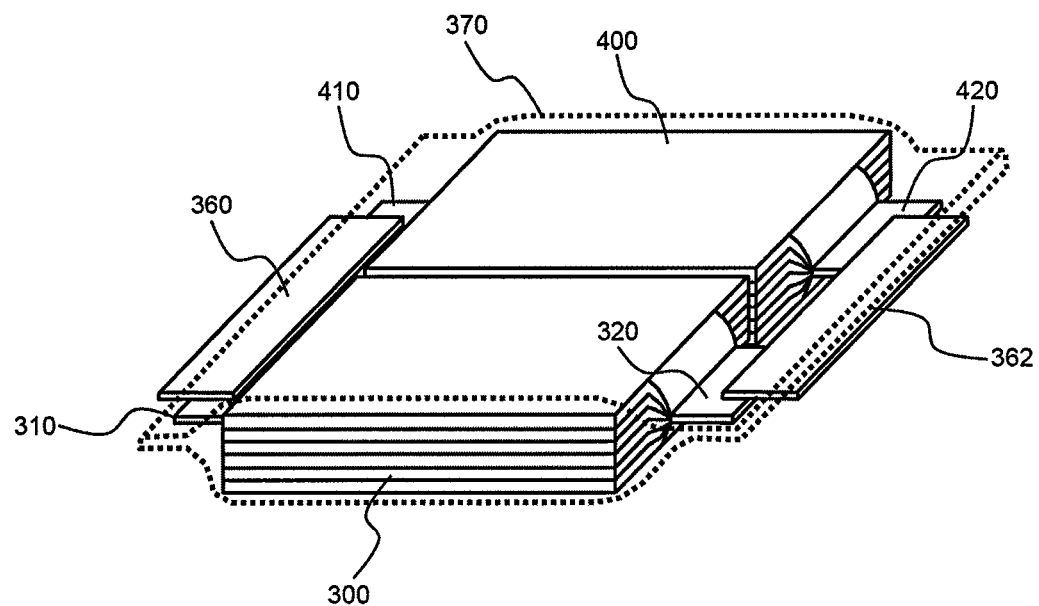
FIG. 2 is a perspective view illustrating a plane arrangement type parallel connection structure of unit cells as a modification of FIG. 1.
Figure 3:
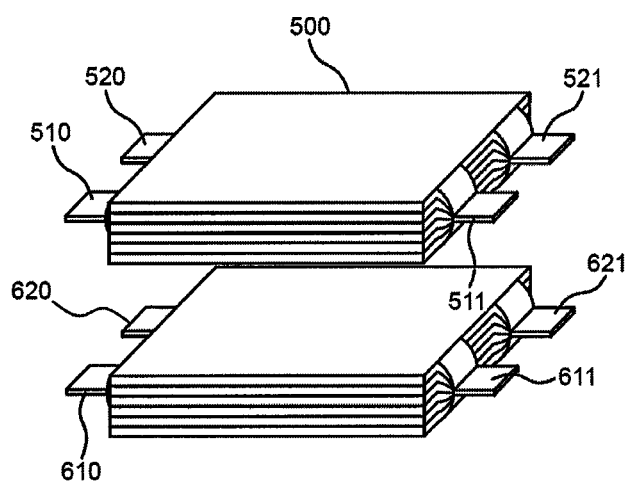
FIG. 3 is a perspective view illustrating a stacking arrangement type parallel connection structure of unit cells, each of which has a pair of cathode and anode terminals protruding from each side thereof, as a modification of FIG. 1.

FIGS. 2 and 3 are perspective views typically illustrating modifications of FIG. 1.

The structure of FIG. 2 is different from the structure of FIG. 1 in that unit cells of FIG. 2 are arranged in a plane arrangement type parallel connection structure. Referring to FIG. 2, a third unit cell 300 is arranged such that an anode terminal 310 of the third unit cell 300 is directed to the upper end of the unit cell, and a fourth unit cell 400 is arranged such that an anode terminal 410 of the third unit cell 400 is directed to the upper end of the unit cell. One side of the fourth unit cell 400 is in contact with one side of the third unit cell 300. The anode terminal 310 of the third unit cell 300 and the anode terminal 410 of the fourth unit cell 400 are coupled to an electrode lead 360 by welding. Similarly, a cathode terminal 320 of the third unit cell 300 and a cathode terminal 420 of the fourth unit cell 400 are also coupled to another electrode lead 362 by welding. As a result, the third unit cell 300 and the fourth unit cell 400 are connected in parallel with each other, while the third unit cell 300 and the fourth unit cell 400 are arranged on the same plane, to construct a battery cell.

The battery cell is mounted in a pouch-shaped case 370 having a length approximately corresponding to the sum of the width of the third unit cell 300 and the width of the fourth unit cell 400.

The electrode leads 360 and 362, used to connect the third unit cell 300 and the fourth unit cell 400 in parallel with each other, are partially exposed outward from the pouch-shaped case 370 to form input and output terminals.

FIG. 3 illustrates a stacking arrangement type parallel connection structure of unit cells; however, the structure of FIG. 3 is different from the structure of FIG. 1 in that a pair of cathode and anode terminals protrude from each side of each unit cell. Referring to FIG. 3, a fifth unit cell 500 and a sixth unit cell 600 are constructed in a structure in which pairs of cathode and anode terminals protrude from opposite sides of the respective unit cells. Electrode terminals 510 and 520 formed at the upper end of the fifth unit cell 500 may be the same electrode or different electrodes. When the upper-end electrode terminals 510 and 520 of the fifth unit cell 500 are the same anode, upper-end electrode terminals 610 and 620 of the sixth unit cell 600 are also the same anode. The coupling relationship between the fifth unit cell 500 and the sixth unit cell 600 is the same as in FIG. 1. As a result, an anode is formed at the upper end of the battery cell by the upper-end electrode terminals 510, 520, 610 and 620 of the fifth unit cell 500 and the sixth unit cell 600, and a cathode is formed at the lower end of the battery cell by lower-end electrode terminals 511, 521, 611 and 621 of the fifth unit cell 500 and the sixth unit cell 600.

As another example, electrode terminals 510 and 520 formed at the upper end of the fifth unit cell 500 may be different electrodes, i.e., the anode and the cathode, respectively. In this case, the upper-end electrode terminals 610 and 620 of the sixth unit cell 600 are also the anode and the cathode, respectively. The electrode terminals 510 and 520 of the fifth unit cell 500 are connected in parallel with the electrode terminals 610 and 620 of the sixth unit cell 600 such that the electrodes having the same polarity are connected with each other. The lower-end electrode terminals 511, 521, 611 and 621 of the fifth unit cell 500 and the sixth unit cell 600 have the same electrode structure and connection fashion as the above. As a result, the fifth unit cell 500 and the sixth unit cell 600 are arranged in the stacking arrangement type parallel connection structure to construct a battery cell having a cathode and anode formed at the upper and lower ends thereof. As various kinds of devices having different structures have appeared, the battery cells having the above-described modified structures are expected to be used based on unique shapes of the devices.

Figure 5:
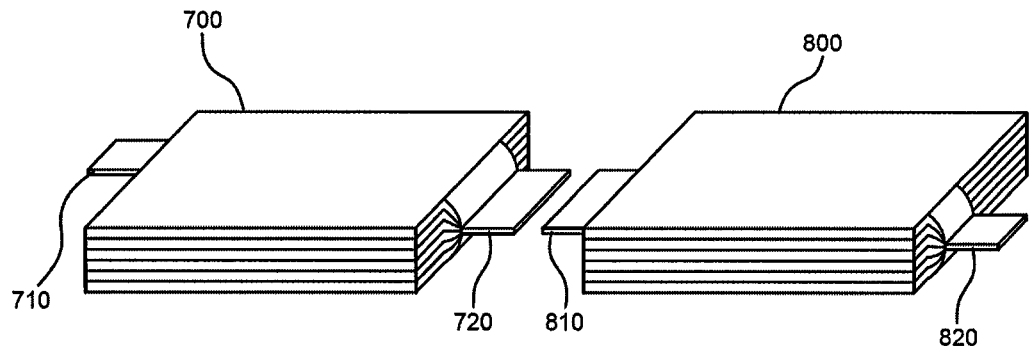
FIG. 5 is a perspective view illustrating a series connection structure of unit cells constituting a secondary battery according to another preferred embodiment of the present invention.

FIG. 5 is a perspective view typically illustrating a series connection structure of unit cells constituting a secondary battery according to another preferred embodiment of the present invention.

Referring to FIG. 5, a seventh unit cell 700 is arranged such that an anode terminal 710 of the seventh unit cell 700 is directed to the upper end of the unit cell, and an eighth unit cell 800 is arranged such that an anode terminal 810 of the eighth unit cell 800 is directed to the upper end of the unit cell. Also, the eighth unit cell 800 is located at the lower end of the seventh unit cell 700, and therefore, the anode terminal 810 of the eighth unit cell 800 is adjacent to a cathode terminal 720 of the seventh unit cell 700. The anode terminal 810 of the eighth unit cell 800 is coupled to the cathode terminal 720 of the seventh unit cell 700 by welding, with the result that the two unit cells 700 and 800 are connected in series with each other.

The connection region between the electrode terminals 720 and 810 of the two unit cells 700 and 800 is bent to arrange the unit cells 700 and 800 in a stacking arrangement structure, and then the stacked unit cells 700 and 800 are mounted in a receiving part 910 of a battery case 900, to manufacture a secondary battery 1000. The structure of the secondary battery 100 is clearly illustrated in FIG. 6.

Figure 6:
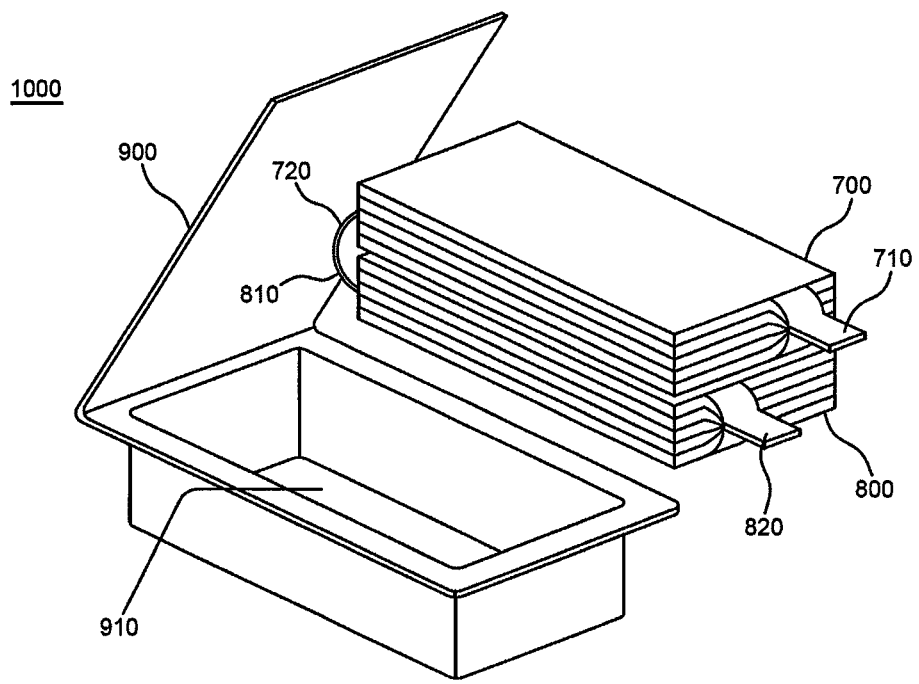
FIG. 6 is an exploded perspective view of illustrating a secondary battery including the unit cells of FIG. 5.

Referring to FIG. 6, the secondary battery 1000 is manufactured by connecting the two unit cells 700 and 800, such that the electrode terminals 720 and 810 protruding from one-side ends of the unit cells 700 and 800 are coupled to each other, mounting the connected unit cells 700 and 800 into the receiving part 910 of the battery case 900, and sealing the receiving part 910 of the battery case 900 with a cover.

The electrode terminals 720 and 810, which are not coupled to each other, of the two unit cells 700 and 800 are arranged eccentrically at one-side ends of the respective unit cells 700 and 800, such that the electrode terminals 720 and 810 protrude while being spaced apart from each other, when the unit cells 700 and 800 are mounted into the battery case 900. For convenience of understanding, FIG. 6 illustrates that there is a deviation in height between the anode terminal 710 of the seventh unit cell 700 and the cathode terminal 820 of the eighth unit cell 800; however, the anode terminal 710 of the seventh unit cell 700 and the cathode terminal 820 of the eighth unit cell 800 are mounted such that the anode terminal 710 and the cathode terminal 820 are located at the front end of the battery case 900 in the actual battery manufacturing process. An electrode lead (not shown) may be used when the anode terminal 710 of the seventh unit cell 700 and the cathode terminal 820 of the eighth unit cell 800 are mounted at the same plane.

A method of constructing a secondary battery according to the present invention using the two unit cells 100 and 200; 300 and 400; 500 and 600 having the parallel connection structures as shown in FIGS. 1 to 3 is substantially the same as that of FIG. 6; however, the former is different from the latter in that the anode terminal and the cathode terminal, as external input and output terminals, protrude from the upper end and the lower end of the battery case 900, respectively.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

INDUSTRIAL APPLICABILITY

As apparent from the above description, the electrical and physical coupling force between the unit cells is increased. Consequently, the high-capacity secondary battery according to the present invention exhibits an improved structural stability. In addition, it is possible to greatly increase the capacity of the secondary battery according to the present invention through a simple assembly process.

What is claimed is:

1. A secondary battery comprising: two or more unit cells and a long separator sheet in a battery case, wherein each unit cell comprises electrode assemblies comprising bicells, full cells, or both, each unit cell extending between first and second opposing ends, the first end having at least one first terminal protruding therefrom in a first direction, and the second end having at least one second terminal protruding therefrom in a second direction opposite the first direction, wherein the unit cells are arranged in a stacking arrangement structure or a plane arrangement structure in the battery case while the electrode terminals of the unit cells are connected with each other, and wherein the long separator sheet is disposed between the electrode assemblies in one of the unit cells and surrounds all of the unit cells.

2. The secondary battery according to claim 1, wherein the each unit cell comprises a predetermined number of bicells.

3. The secondary battery according to claim 2, wherein the number of the bicells is 3 to 30.

4. The secondary battery according to claim 1, wherein the unit cells are connected in parallel or in series with each other.

5. The secondary battery according to claim 4, wherein the each unit cell comprises one electrode terminal formed at each end thereof, the unit cells are stacked in the thickness direction of the unit cells such that the electrode terminals having the same polarity are directed in the same direction, and the electrode terminals, having the same polarity, of the unit cells are coupled to each other at opposite ends thereof, whereby the unit cells are connected in parallel with each other.

6. The secondary battery according to claim 4, wherein the each unit cell comprises two electrode terminals formed at each end thereof, the electrode terminals formed at each end of the each unit cell having the same polarity, the unit cells are stacked in the thickness direction of the unit cells such that the electrode terminals having the same polarity are adjacent to each other, and the electrode terminals, having the same polarity, of the unit cells are coupled to each other at opposite ends thereof, whereby the unit cells are connected in parallel with each other.

7. The secondary battery according to claim 4, wherein the each unit cell comprises two electrode terminals formed at each end thereof, the electrode terminals formed at each end of the each unit cell having different polarities, the unit cells are stacked in the thickness direction of the unit cells such that the electrode terminals having the same polarity are adjacent to each other, and the electrode terminals, having the same polarity, of the unit cells are coupled to each other at opposite ends thereof, whereby the unit cells are connected in parallel with each other.

8. The secondary battery according to claim 4, wherein the each unit cell comprises one electrode terminal formed at each end thereof, the unit cells are arranged in the lateral direction of the unit cells, while the unit cells are adjacent to each other, such that the electrode terminals having the same polarity are directed in the same direction, and the electrode terminals, having the same polarity, of the unit cells are coupled to each other at opposite ends thereof by connecting members, whereby the unit cells are connected in parallel with each other.

9. The secondary battery according to claim 8, wherein the connecting members are electrode leads made of a conductive material.

10. The secondary battery according to claim 4, wherein the each unit cell comprises one electrode terminal formed at each end thereof, the unit cells are stacked such that the electrode terminals having the same polarity are directed in the same directions, and the electrode terminals, having different polarities, of the unit cells are coupled to each other at facing ends thereof, whereby the unit cells are connected in series with each other.

11. The secondary battery according to claim 10, wherein the remaining electrode terminals, which are not coupled to each other, of the unit cells are biased to the left side and the right side of the unit cells, such that the electrode terminals are spaced a predetermined distance from each other at one side of the battery case, when the unit cells are mounted into the battery case.

12. The secondary battery according to claim 1, wherein the battery case is made of a laminate sheet comprising a metal layer and a resin layer.

13. The secondary battery according to claim 12, wherein the battery case is a pouch-shaped case made of an aluminum laminate sheet.

14. A battery module comprising a plurality of secondary batteries according to claim 1 as unit cells.

15. A battery pack comprising one or more middle-or large-sized battery modules according to claim 14 and a control unit for controlling the operation of the battery modules.

16. An electric vehicle comprising the secondary battery of claim 1.

17. A hybrid electric vehicle comprising the secondary battery of claim 1.

18. An electric motorcycle comprising the secondary battery of claim 1.

19. A secondary battery comprising: two or more unit cells and a long separator sheet in a battery case, wherein each unit cell is constructed in a structure in which cathodes and anodes facing each other are stacked, while a separator or the long separator sheet is respectively disposed between the cathode and the anodes, each unit cell extending between first and second opposing ends, the first end having at least one first terminal protruding therefrom in a first direction, and the second end having at least one second terminal protruding therefrom in a second direction opposite the first direction, wherein the unit cells are arranged in a stacking arrangement structure or a plane arrangement structure in the battery case while the electrode terminals of the unit cells are connected with each other, and the long separator sheet is disposed between the electrode assemblies in one of the unit cells and surrounds all of the unit cells.

* * * * *